United States Patent
Tanaka

(10) Patent No.: US 12,479,110 B2
(45) Date of Patent: Nov. 25, 2025

(54) ROBOT SYSTEM

(71) Applicant: FANUC CORPORATION, Yamanashi (JP)

(72) Inventor: Motoyuki Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 280 days.

(21) Appl. No.: 18/016,108

(22) PCT Filed: Aug. 16, 2021

(86) PCT No.: PCT/JP2021/029851
§ 371 (c)(1),
(2) Date: Jan. 13, 2023

(87) PCT Pub. No.: WO2022/039115
PCT Pub. Date: Feb. 24, 2022

(65) Prior Publication Data
US 2023/0271329 A1     Aug. 31, 2023

(30) Foreign Application Priority Data
Aug. 20, 2020    (JP) .................................. 2020-139365

(51) Int. Cl.
*B25J 11/00*     (2006.01)
*B25J 9/16*      (2006.01)

(52) U.S. Cl.
CPC ............. *B25J 11/005* (2013.01); *B25J 9/161* (2013.01); *B25J 9/1653* (2013.01); *B25J 9/1697* (2013.01)

(58) Field of Classification Search
CPC ........ B25J 11/005; B25J 9/161; B25J 9/1653; B25J 9/1697
See application file for complete search history.

(56) References Cited

U.S. PATENT DOCUMENTS

2013/0144440 A1   6/2013   Shimizu et al.
2018/0099408 A1   4/2018   Shibata

FOREIGN PATENT DOCUMENTS

CN    1754665 A    4/2006
CN    108537808 A  9/2018
(Continued)

OTHER PUBLICATIONS

JP2019020670A—translation (Year: 2019).*

*Primary Examiner* — Abby Lin
*Assistant Examiner* — Renee LaRose
(74) *Attorney, Agent, or Firm* — Renner, Otto, Boisselle & Sklar, LLP

(57) ABSTRACT

A robot system including a robot configured to grip and carry a workpiece, and a controller configured to control the robot, wherein the controller includes a physique-information acquisition unit that acquires physique information of an actual worker who performs work on the workpiece cooperatively with the robot, a physique-information storage unit configured to store physique information of a reference worker, a program storage unit configured to store a motion program including one or more taught points for disposing the workpiece at a position and orientation suitable for the work performed by the reference worker, and a program correction unit that perform correction on the taught points of the motion program stored in the program storage unit based on the physique information of the actual worker acquired by the physique-information acquisition unit and the physique information of the reference worker stored in the physique-information storage unit.

6 Claims, 14 Drawing Sheets

(56) References Cited

FOREIGN PATENT DOCUMENTS

| | | | |
|---|---|---|---|
| CN | 109834695 A | | 6/2019 |
| JP | H08286726 A | | 11/1996 |
| JP | 2007038334 A | | 2/2007 |
| JP | 2010211726 A | | 9/2010 |
| JP | 2013111737 A | | 6/2013 |
| JP | 2015231640 A | | 12/2015 |
| JP | 2018062016 A | | 4/2018 |
| JP | 2019020670 A | * | 2/2019 |
| JP | 2019098455 A | | 6/2019 |
| WO | 2020-045396 A1 | | 3/2020 |

* cited by examiner

| | IDENTIFICATION INFORMATION | HEIGHT |
|---|---|---|
| REFERENCE WORKER | S | $L_S$ |
| ACTUAL WORKER | R1 | $L_{R1}$ |
| ACTUAL WORKER | R2 | $L_{R2}$ |
| ACTUAL WORKER | R3 | $L_{R3}$ |
| ACTUAL WORKER | R4 | $L_{R4}$ |
| ACTUAL WORKER | ... | ... |
| | | |

FIG. 4

MOTION PROGRAM, REFERENCE WORKER S
   P1, NO CORRECTION NEEDED
   P2, NO CORRECTION NEEDED
   P3, NO CORRECTION NEEDED
   P4, CORRECTION NEEDED

FIG. 5

MOTION PROGRAM, REFERENCE WORKER S
   P1, NO CORRECTION NEEDED
   P2, NO CORRECTION NEEDED
   P3, NO CORRECTION NEEDED
   P4, CORRECTION NEEDED, ACTUAL WORKER R1

FIG. 10

```
MOTION PROGRAM
  P1, CORRECTION NEEDED, REFERENCE WORKER S1, ACTUAL WORKER R1
  P2, NO CORRECTION NEEDED
  P3, NO CORRECTION NEEDED
  P4, CORRECTION NEEDED, REFERENCE WORKER S2, ACTUAL WORKER R3
```

FIG. 13

MOTION PROGRAM
P1, NO CORRECTION NEEDED
P2, NO CORRECTION NEEDED
P3, CORRECTION NEEDED, REFERENCE WORKER S1, ACTUAL WORKER R1
P4, NO CORRECTION NEEDED
P5, CORRECTION NEEDED, REFERENCE WORKER S2, ACTUAL WORKER R2
P6, CORRECTION NEEDED, REFERENCE WORKER S1, ACTUAL WORKER R3

FIG. 15

MOTION PROGRAM, REFERENCE WORKER S
 P1, NO CORRECTION NEEDED
 P2, NO CORRECTION NEEDED
 P3, NO CORRECTION NEEDED
 P4, CORRECTION NEEDED, ACTUAL WORKER R2, UPPER LIMIT VALUE, LOWER LIMIT VALUE

ROBOT SYSTEM

TECHNICAL FIELD

The present disclosure relates to a robot system.

BACKGROUND ART

There is a known robot system in which a robot and a worker cooperatively perform assembly work (for example, see PTL 1).

CITATION LIST

Patent Literature

{PTL 1} Japanese Unexamined Patent Application, Publication No. 2018-062016

SUMMARY

An aspect of the present disclosure is a robot system including: a robot configured to grip and carry a workpiece; and a controller configured to control the robot, wherein the controller includes a physique-information acquisition unit that acquires physique information of an actual worker who performs work on the workpiece cooperatively with the robot, a physique-information storage unit configured to store physique information of a reference worker, a program storage unit configured to store a motion program including one or more taught points for disposing the workpiece at a position and orientation suitable for the work performed by the reference worker, and a program correction unit that perform correction on the taught points of the motion program stored in the program storage unit based on the physique information of the actual worker acquired by the physique-information acquisition unit and the physique information of the reference worker stored in the physique-information storage unit.

BRIEF DESCRIPTION OF DRAWINGS

FIG. 4 is a diagram showing examples of identification information of a reference worker associated with a motion program stored in the memory in FIG. 2 and flags that are associated with individual taught points.

FIG. 5 is a diagram showing an example of identification information of an actual worker associated with a taught point to which a "correction needed" flag for the motion program in FIG. 4 is added.

FIG. 10 is a diagram showing examples of pieces of identification information of the reference workers and the actual workers associated with the taught points in the motion program in FIG. 9 and flags associated with the respective taught points.

FIG. 13 is a diagram showing examples of pieces of identification information of the reference workers and the actual workers associated with the taught points in FIG. 12 and flags associated with the respective taught points.

FIG. 15 is a diagram showing examples of the identification information of the actual worker, associated with the taught point to which the "correction needed" flag for the motion program in FIG. 14 is added, and the upper limit value and the lower limit value thereof.

DESCRIPTION OF EMBODIMENT

In the case in which a worker performs work on a workpiece supported by a robot, the robot is taught so as to place the workpiece at a position and in an orientation that make it easy for the worker to perform the work. However, in the case in which the worker is changed, there are cases in which the height and orientation of the workpiece that make it easy for the worker to perform the work are a height and orientation that are hard for the other worker of different height to perform the work, which is a burden on the other worker.

On the other hand, although teaching the robot for each worker makes it possible to dispose the workpiece at a position and orientation that are suitable for every worker, the teaching requires an enormous amount of man-hours.

Therefore, there is a demand for reducing the burden on workers by disposing a workpiece at a position and orientation that are suitable for every worker without having to reteach a robot.

A robot system 1 according to an embodiment of the present disclosure will be described below with reference to the drawings.

Figure 1:
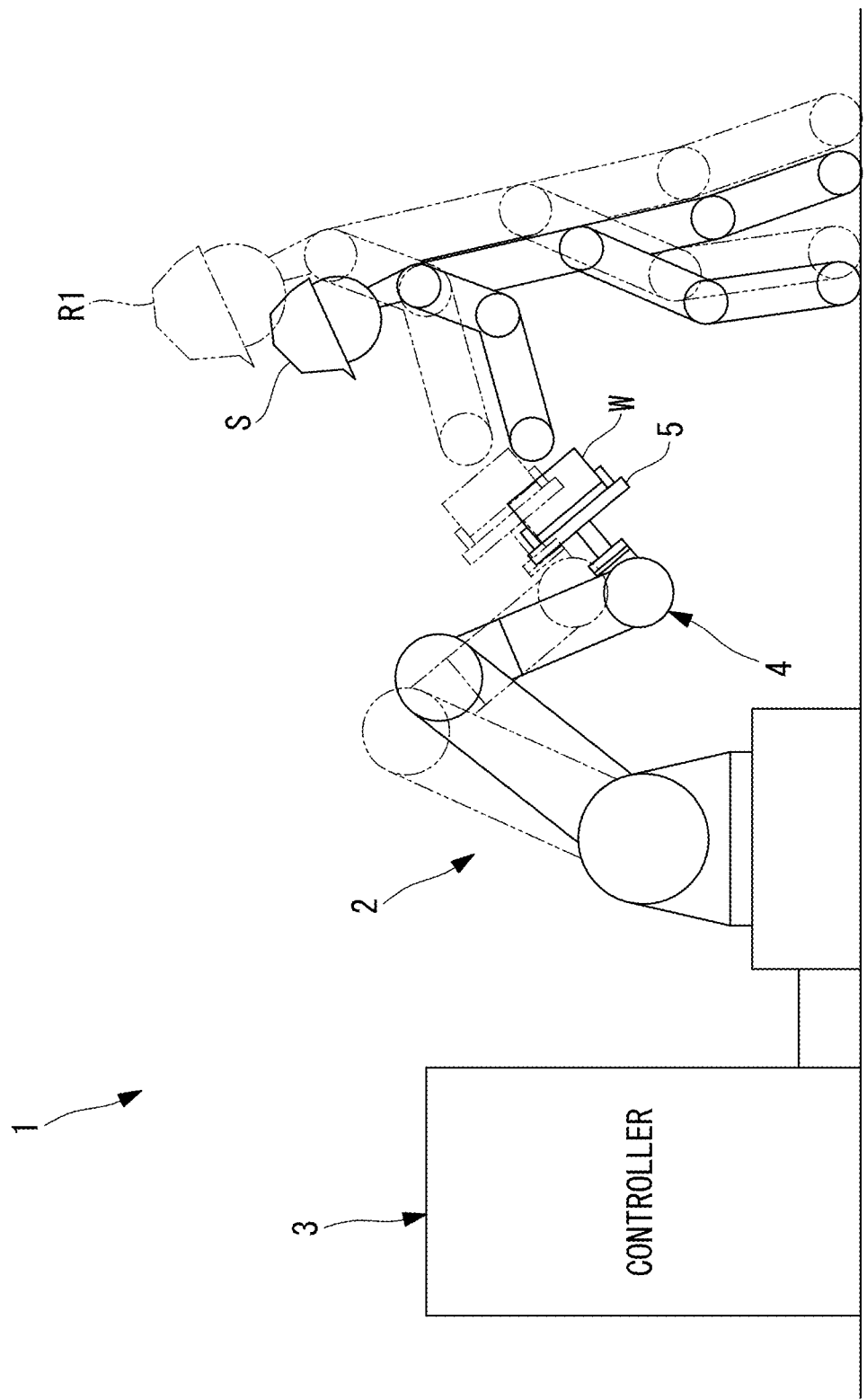
FIG. 1 is an overall configuration diagram showing a robot system according to an embodiment of the present disclosure.

As shown in FIG. 1, the robot system 1 according to this embodiment includes a six-axis articulated-type robot 2 and a controller 3 that controls the robot 2.

The robot 2 includes a built-in sensor (not shown), such as a force sensor, that detects contact from the exterior and is stopped or decelerated in the case in which the sensor detects contact. Therefore, the robot 2 is a cooperative robot that can cooperatively perform work with a worker.

The work performed by a worker may be arbitrary work, for example, assembling a component on a workpiece W, tightening a screw, adjusting the position of a component to be attached, or the like.

A hand 5 that can grip the workpiece W is mounted on a distal end of a wrist 4 of the robot 2.

Figures 2, 3:
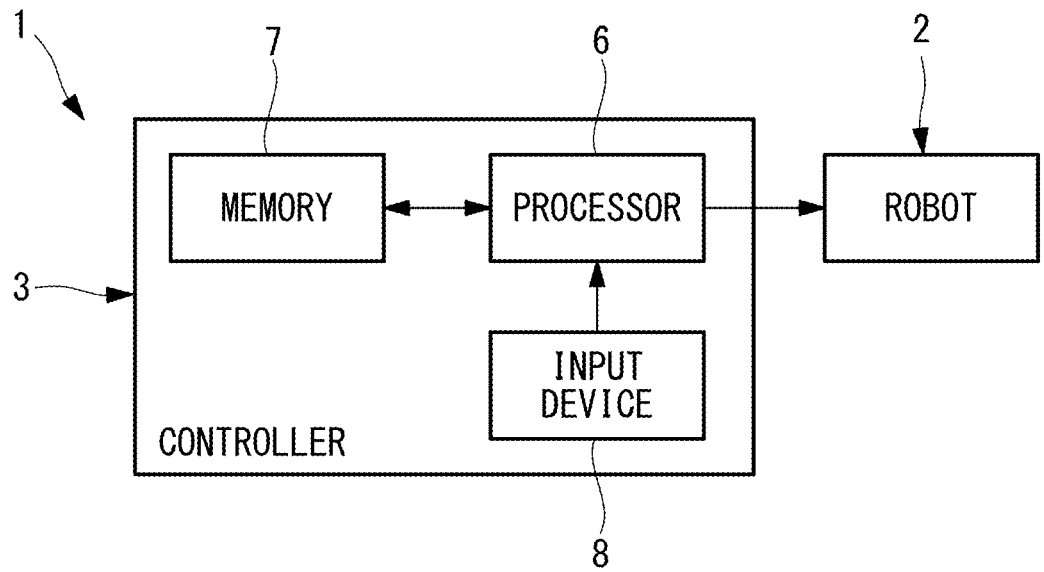
FIG. 2 is a block diagram showing the robot system in FIG. 1.
FIG. 3 is a diagram showing pieces of identification information and heights of workers stored in a memory in FIG. 2 in association with each other.

As shown in FIG. 2, the controller 3 includes at least one processor (program correction unit) 6, a least one memory (physique-information storage unit, program storage unit) 7, and an input device (physique-information acquisition unit) 8.

As shown in FIG. 3, the memory 7 stores identification information S of a reference worker, who serves as a reference, in association with a height (physique information) $L_S$ of the reference worker. In addition, the memory 7 stores pieces of identification information R1, R2, R3, and R4 of actual workers, who are workers that may actually cooperatively work with the robot 2, in association with heights (physique information) $L_{R1}$, $L_{R2}$, $L_{R3}$, and $L_{R4}$ of the actual workers.

In addition, the memory 7 stores a motion program that causes the robot 2 to perform motions. The motion program includes a plurality of taught points. At least one taught point is a work point at which, as a result of the workpiece W gripped by the robot 2 being moved to said taught point, the workpiece W is disposed at a position and an orientation that make it easy for the reference worker to perform the work.

In this embodiment, a flag indicating whether it is necessary to perform correction in accordance with the height of a worker, in other words, a "correction needed" or "no correction needed" flag, can be stored for each of the taught points included in the motion program.

The processor 6 receives an input of the identification information R1, R2, R3, or R4 of an actual worker via an input device 8 before the motion program is executed. As the input device 8, it is possible to employ an arbitrary device with which the identification information can be input, for example, a keyboard, a touch display, a mouse, a card reader, or the like.

When the identification information R1, R2, R3, or R4 of the actual worker is input, the processor 6 reads out the height $L_{R1}$, $L_{R2}$, $L_{R3}$, or $L_{R4}$ of the actual worker stored in the memory 7 by using the input identification information R1, R2, R3, or R4 as a key. Then, the processor 6 calculates a difference ΔL between the read-out height $L_{R1}$, $L_{R2}$, $L_{R3}$, or $L_{R4}$ of the actual worker and the height $L_S$ of the reference worker stored in the memory 7 and corrects the coordinates of the taught points only for the taught points for which the "correction needed" flags are recorded.

Specifically, as a result of the reference worker who has input the identification information S inputting his/her own identification information S and teaching the robot 2 the plurality of taught points by employing a teaching operation panel (not shown) or the like, a motion program with which the workpiece W can be disposed at the position and orientation that are suitable for the reference worker to perform the work is created. As shown in FIG. 4, the created motion program is stored in the memory 7 in association with the identification information S of the reference worker.

Alternatively, a motion program created offline so as to dispose the workpiece W at the position and orientation assumed to be suitable for the reference worker is stored in the memory 7 in association with the identification information S of the reference worker.

When a motion program is created, a plurality of taught points P1-P4 are taught and, as shown in FIG. 4, a "correction needed" or "no correction needed" flag which is given to each of the taught points P1-P4 and which is response to the height $L_{R1}$, $L_{R2}$, $L_{R3}$, or $L_{R4}$ of the actual worker. FIG. 4 only shows the identification information S of the reference worker associated with the motion program and the taught points P1-P4 in the motion program and the flags.

Figure 6:
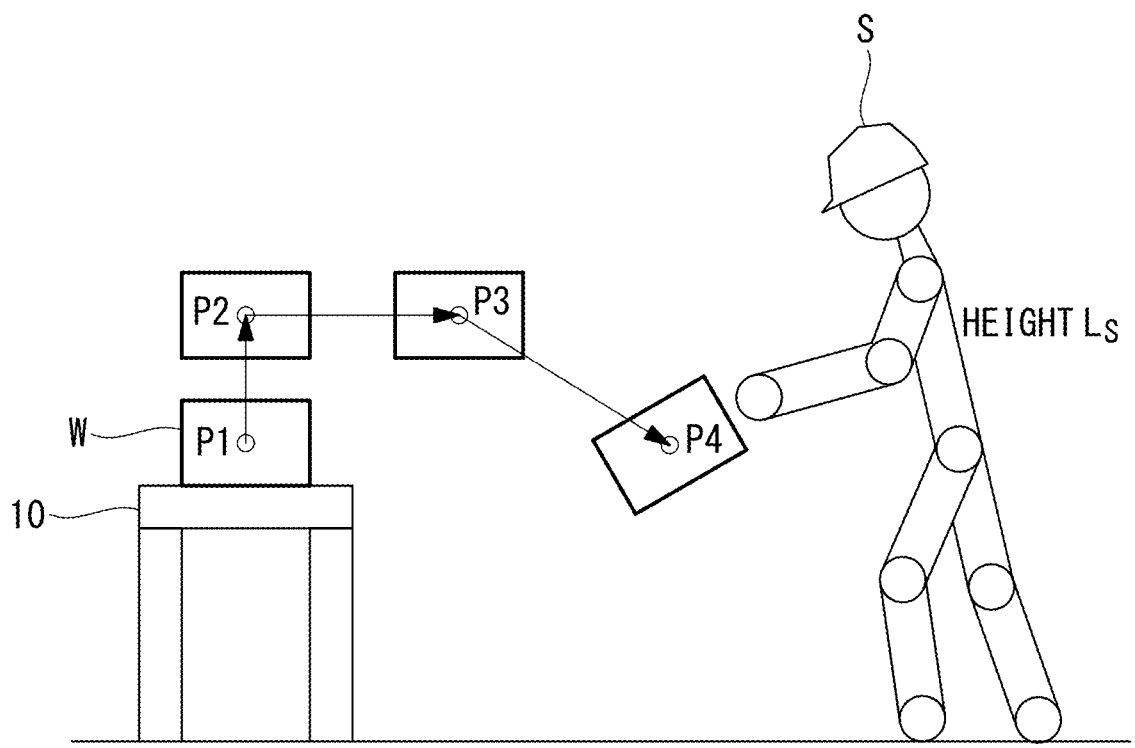
FIG. 6 is a diagram for explaining the relationship between the taught points and the reference worker in an example of the motion program in the robot system in FIG. 1.

As shown in FIG. 6, for example, the motion program is assumed to cause the robot 2 to grip and lift the workpiece W placed on a table 10 and move the workpiece W to a work position at which a worker performs work. This motion program includes a taught point P1, which is the position at which the workpiece W on the table 10 is gripped, a taught point P2, which is the position at which the workpiece W is lifted up from the table 10, a taught point P3, which is the position to which the workpiece W is moved away from above the table 10, and a taught point P4, which is a work point at which the worker performs the work.

With this motion program, the "no correction needed" flags are added to the taught points P1, P2, and P3 and the "correction needed" flag is given only to the taught point P4.

In the case in which the taught point P4 to which the "correction needed" flag is added is present, the processor 6 receives the input of the identification information R1, R2, R3, or R4 of the actual worker via the input device 8. As shown in FIG. 5, the input identification information R1, R2, R3, or R4 of the actual worker is stored in the memory 7 in association with the taught point P4. FIG. 5 also shows only the identification information S of the reference worker associated with the motion program, the taught points P1, P2, P3, and P4 in the motion program, the flags, and the identification information R1 of the actual worker.

Then, when the motion program is executed, the processor 6 corrects, as described below, the taught point P4 to which the "correction needed" flag is added.

For example, the coordinates of the taught point P4 to which the "correction needed" flag is added are assumed to be (x, y, z). The processor 6 calculates a difference $\Delta L = L_{R1} - L_S$ from the height $L_S$ of the reference worker S and the height $L_{R1}$ of the actual worker R1.

Then, the z-coordinate of the taught point P4 is corrected by using the equation below.

$$z' = z + \alpha \Delta L$$

Here, α is a positive constant and is set to be an appropriate value on the basis of an experiment or the like.

Meanwhile, the processor 6 does not correct the taught points P1, P2, and P3 to which the "no correction needed" flags are added.

As explained above, with the robot system 1 according to this embodiment, in the case in which there is a height difference between the reference worker S who taught the motion program and the actual worker R1 who is different from the reference worker S, the z-coordinate of the taught point P4 for which correction is needed is corrected, and the coordinates of the taught points P1, P2, and P3 for which correction is not needed are maintained without correction.

Figure 7:
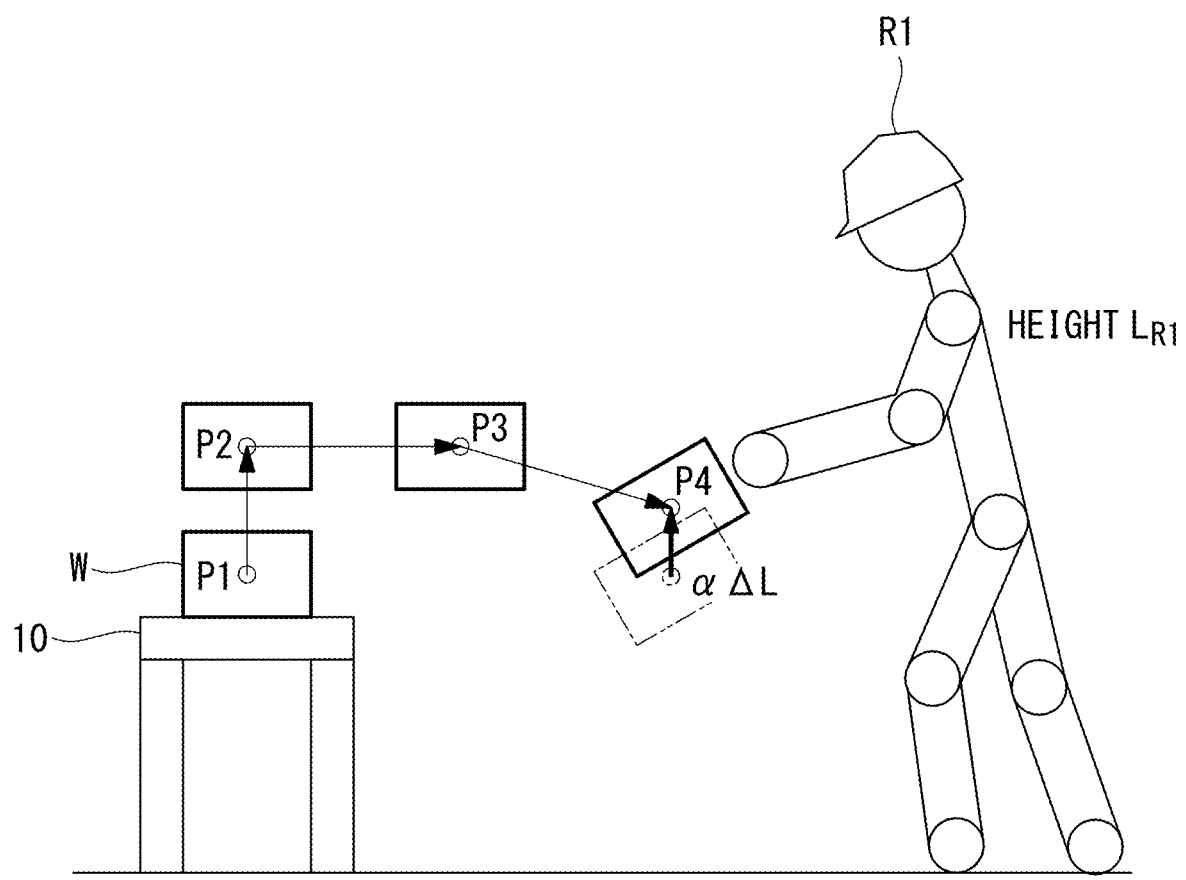
FIG. 7 is a diagram for explaining the relationship between the taught points and the actual worker when the motion program in FIG. 6 is executed.
Figure 8:
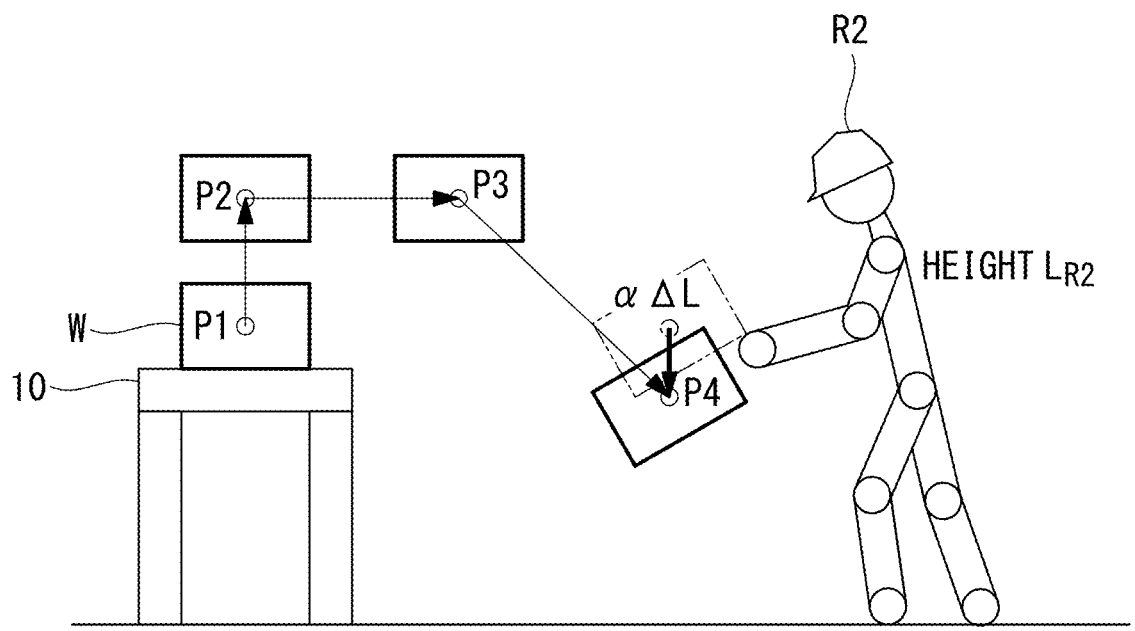
FIG. 8 is a diagram for explaining the relationship between the taught points and another actual worker when the motion program in FIG. 6 is executed.

For example, as shown in FIGS. 6 and 7, in the case in which the height $L_{R1}$ of the actual worker R1 is higher than the height $L_S$ of the reference worker S, the z-coordinate of the taught point P4 taught by the reference worker S is increased by an amount proportional to the height difference ΔL. In contrast, as shown in FIGS. 6 and 8, in the case in which the height $L_{R2}$ of the actual worker R2 is lower than the height $L_S$ of the reference worker S, the z-coordinate of the taught point P4 taught by the reference worker S is decreased by an amount proportional to the height difference ΔL.

Accordingly, in the case in which a motion program that includes the taught point P4 corresponding to the position and the orientation that make it easy for the reference worker S to perform the work on the workpiece W is created, the z-coordinate of the taught point P4 in the motion program is increased/decreased in the case in which the actual worker R1 or R2 whose height is different from that of the reference worker S performs the work.

Because the amount by which the z-coordinate is increased/decreased by the correction is proportional to the height difference ΔL, the actual worker R1, who is taller than the reference worker S, can easily perform the work on the workpiece W disposed at a higher position than the position for the reference worker S. In addition, the actual worker R2, who is shorter than the reference worker S, can easily perform the work on the workpiece W disposed at a lower position than the position for the reference worker S.

Accordingly, there is an advantage in that, even in the case in which the actual worker R1 or R2 having a large height difference ΔL with respect to the reference worker S performs the work, it is possible to reduce the burden on the actual worker R1 or R2 as a result of disposing the workpiece W at the position and orientation that are suitable for the actual worker R1 or R2.

Meanwhile, because the correction is not applied to the taught points P1, P2, and P3 to which the "no correction needed" flags are added, it is possible to prevent the workpiece W from interfering with the table 10 during the motion of gripping the workpiece W on the table 10 and the motion of moving the workpiece W away from the table 10.

In other words, with the robot system 1 according to this embodiment, it is possible to set whether the correction is needed for each of the taught points P1, P2, P3, and P4 in the motion program, and it is possible to correct only the taught point P1, P2, P3, or P4, for which correction is needed, in accordance with the height $L_{R1}$, $L_{R2}$, $L_{R3}$, or $L_{R4}$ of the actual worker R1, R2, R3, or R4. Accordingly, there is an advantage in that it is not necessary to reteach the motion program.

Note that the robot system 1 according to this embodiment has been described in terms of an example in which the motion program suitable for one reference worker S is employed to allow another actual worker R1 (or actual worker R2) that is different from the reference worker S to cooperatively perform the work with the robot 2. Alternatively, the robot system 1 according to this embodiment may be applied to a case in which, as shown in FIG. 9, different reference workers S1 and S2 and different actual workers R1 and R3 cooperatively perform the work with the robot 2 at different taught points P1, P2, P3 and P4.

Figure 9:
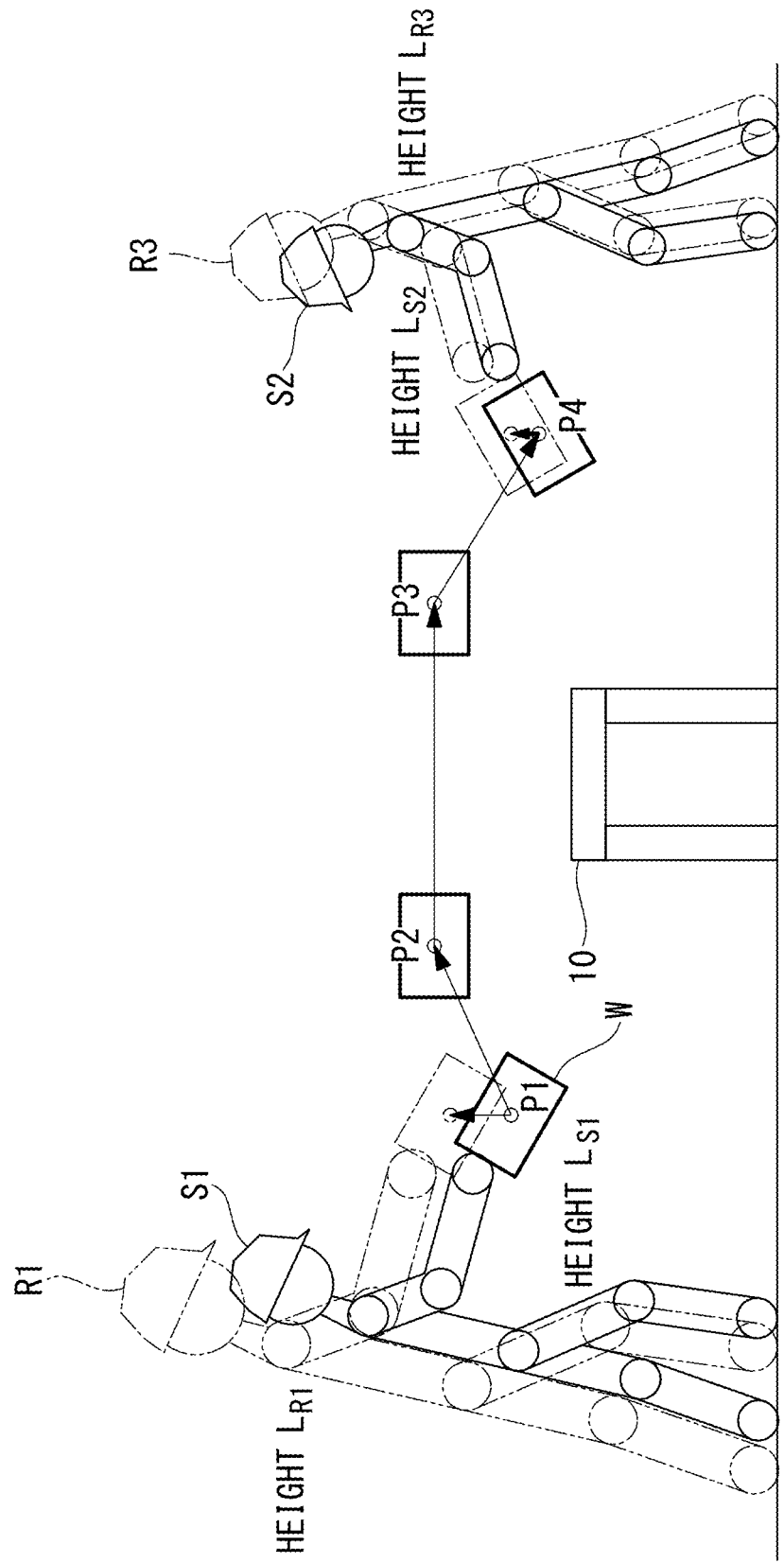
FIG. 9 is a diagram showing a modification of the robot system in FIG. 1 and is a diagram showing taught points in an example of a motion program involving two reference workers and two actual workers.

In the example shown in FIG. 9, a motion program taught so as to be suitable for the two reference workers S1 and S2 is employed to allow the two other actual workers R1 and R3 to cooperatively perform the work with the robot 2.

In this case, when the motion program is created, as shown in FIG. 10, the taught point P1 at which the reference worker S1 performs the work may be stored in association with the identification information S1 of the reference worker S1 and the taught point P4 at which the reference worker S2 performs the work may be stored in association with the identification information S2 of the reference worker S2. In addition, the "correction needed" flag is added to each of the taught points P1 and P4 and the "no correction needed" flags are added to the other taught points P2 and P3.

Also, regarding the taught points P1 and P4 to which the "correction needed" flags are added, the processor 6 may receive an input of the identification information R1 or R3 of the actual worker R1 or R3 for each of the taught points P1 and P4 before the motion program is executed. Accordingly, when the motion program is executed, the taught points P1 and P4 to which the "correction needed" flags are added are respectively stored in association with the identification information S1 or S2 of the reference worker S1 or S2 and the identification information R1 or R3 of the actual worker R1 or R3. Therefore, the processor 6 can read out, from the memory 7, the heights $L_{S1}$ of the reference worker S1 and the height $L_{R1}$ of the actual worker R1 for the taught point P1 and the height $L_{S2}$ of the reference worker S2 and the height $L_{R3}$ of the actual worker R3 for the taught point P4 by using the pieces of identification information S1, S2, R1 and R3 as keys, determine the difference ΔL between said heights for each of the taught points, and correct the z-coordinate of each of the taught points.

Figure 11:
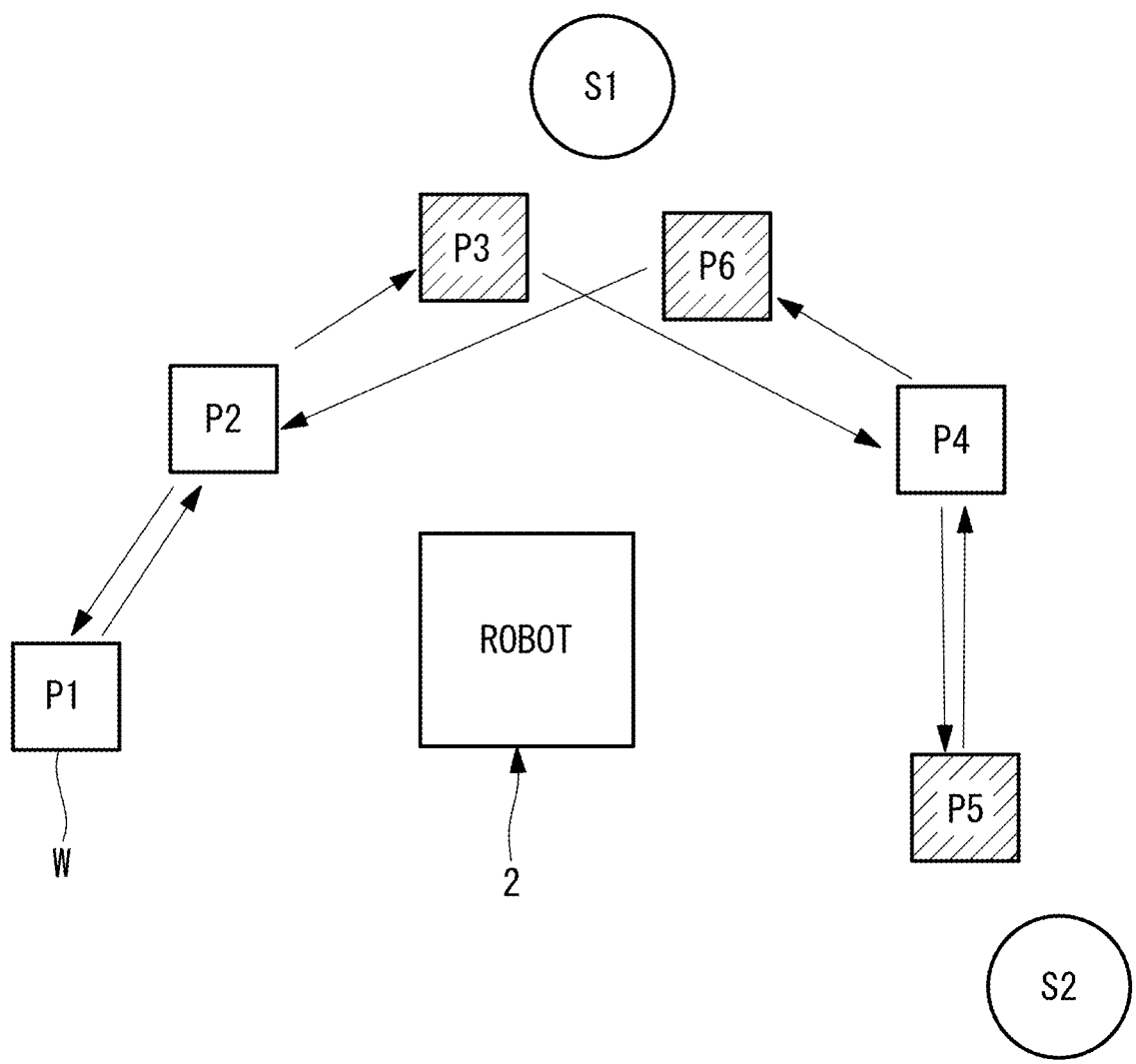
FIG. 11 is a diagram showing another modification of the robot system in FIG. 1 and is a diagram showing an example case in which two reference workers are associated with three taught points each.
Figure 12:
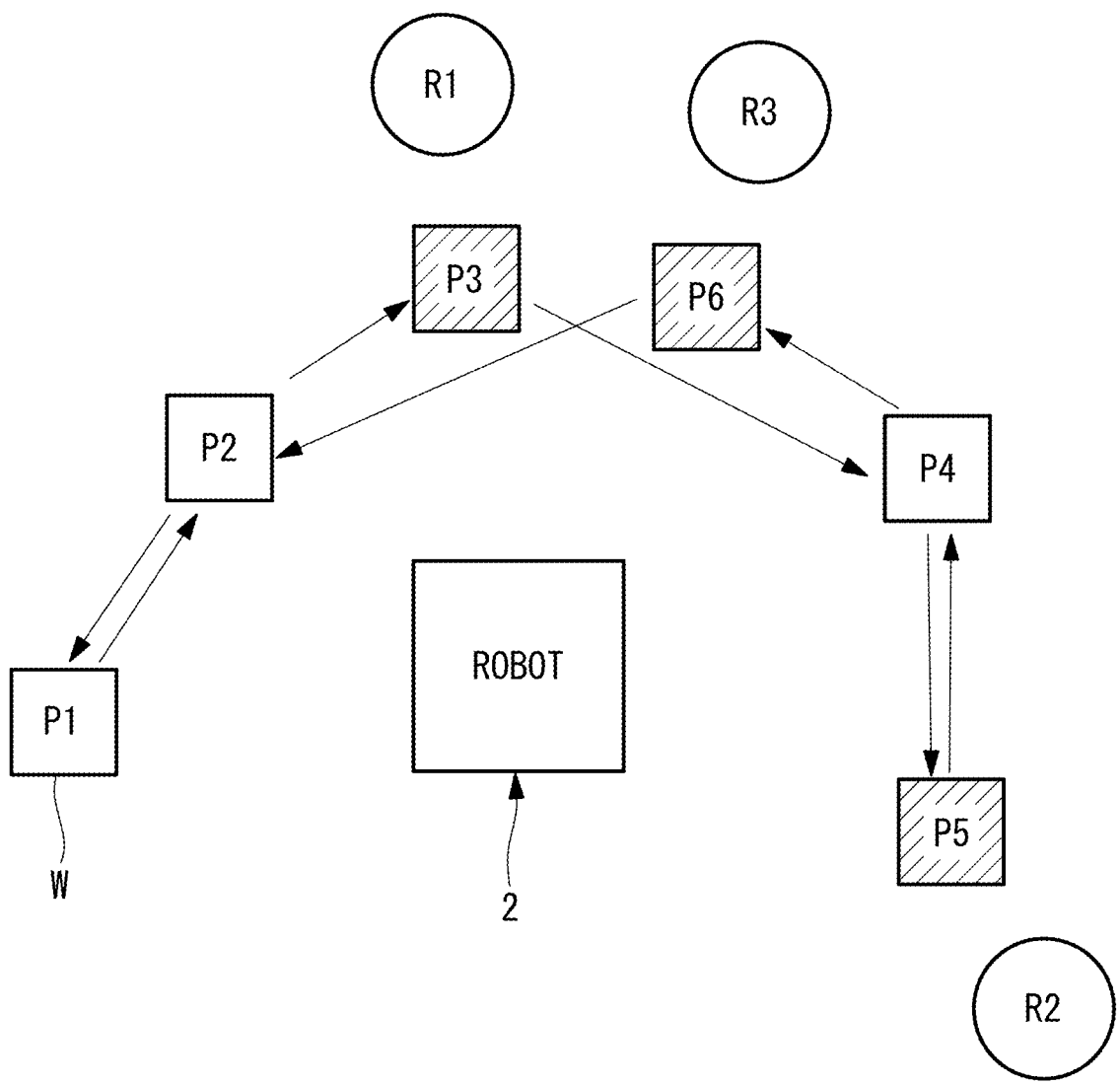
FIG. 12 is a diagram showing an example case in which three actual workers are associated with three taught points each in the robot system in FIG. 11.

In addition, in the example shown in FIGS. 11 and 12, a motion program taught so as to be suitable for the two reference workers S1 and S2 is employed, as shown in FIG. 11, to allow three other actual workers R1, R2, and R3 to cooperatively perform the work with the robot 2, as shown in FIG. 12. Taught points P3, P5, and P6 indicated by hatching in FIGS. 11 and 12 are work points.

In this case also, when the motion program is created, the taught points P3 and P6 at which the reference worker S1 performs the work may be stored in association with the identification information S1 of the reference worker S1 and the taught point P5 at which the reference worker S2 performs the work may be stored in association with the identification information S2 of the reference worker S2. The "correction needed" flag is added to each of the taught points P3, P5, and P6 and the "no correction needed" flags are added to the other taught points P1, P2, and P4.

Also, regarding the taught points P3, P5, and P6 to which the "correction needed" flags are added, the processor 6 may receive an input of the identification information R1, R2, or R3 of the actual worker R1, R2, or R3 for each of the taught points P3, P5, and P6 before the motion program is executed. Accordingly, as shown in FIG. 13, when the motion program is executed, the taught points P1, P5, and P6 are respectively stored in association with the identification information S1 or S2 of the reference worker S1 or S2 and the identification information R1, R2, or R3 of the actual worker R1, R2, or R3. Therefore, for each of the taught points P1, P2, P3, P4, P5, and P6, the processor 6 can read out, from the memory 7, the height $L_{S1}$ of the reference worker S1 and the height $L_{R1}$ of the actual worker R1 for the taught point P3, the height $L_{S2}$ of the reference worker S2 and the height $L_{R2}$ of the actual worker R2 for the taught point P5, and the height $L_{S1}$ of the reference worker S1 and the height $L_{R3}$ of the actual worker R3 for the taught point P6 by using the pieces of identification information S1, S2, R1, R2, and R3 as keys, determine the difference ΔL between said heights for each of the taught points, and correct the z-coordinate of each of the taught points P3, P5, and P6.

Figure 14:
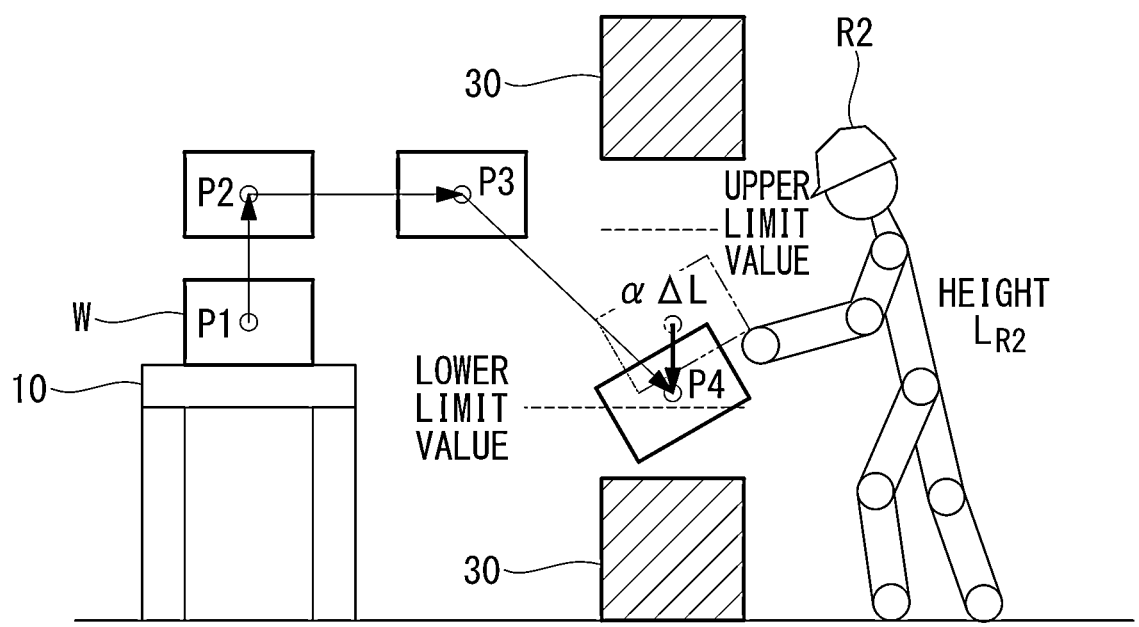
FIG. 14 is a diagram showing a modification of FIG. 8 and is a diagram for explaining an upper limit value and a lower limit value of a taught point in the case in which there are objects above and below a work point.

In addition, this embodiment may be configured so that at least one of an upper limit and a lower limit can be set for each of the taught points P1, P2, P3, and P4 in order to avoid problems caused as a result of correcting the taught points P1, P2, P3, and P4 on the basis of the height $L_{R1}$, $L_{R2}$, $L_{R3}$, or $L_{R4}$ of the actual worker R1, R2, R3, or R4. For example, as shown in FIG. 14, in the case in which objects 30, such as external structures, are present above and below a work point at which the actual worker R2 performs the work on the workpiece W, if the taught point P4 is equally moved up and down in accordance with the height $L_{R2}$ of the actual worker R2, there is a risk of the workpiece W or the robot 2 interfering with the objects 30.

Therefore, as shown in FIG. 15, an upper limit value or a lower limit value may be set for the taught point P4 to which the "correction needed" flag is added. Then, the processor 6 may correct the z-coordinate of the taught point P4 so as to be the upper limit value or the lower limit value in the case in which the taught point P4 would be at a position higher than the upper limit value or a position lower than the lower limit value as a result of the correction based on the height difference ΔL.

Figure 16:
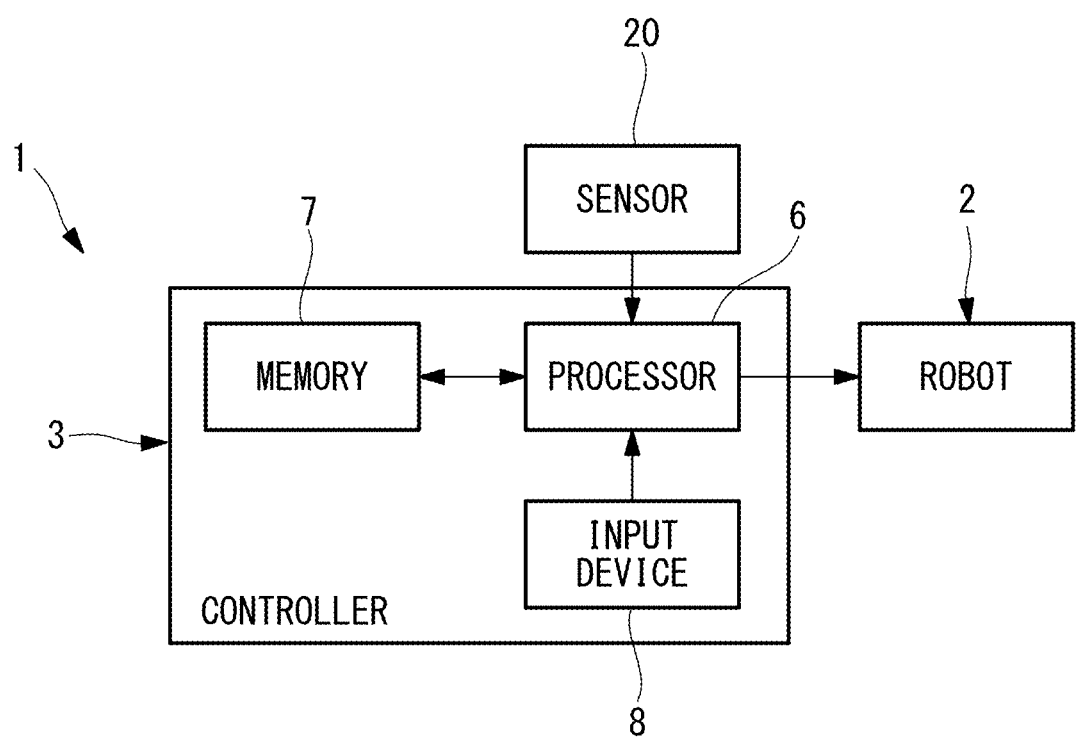
FIG. 16 is a diagram showing another modification of the robot system in FIG. 2 and is a block diagram showing a robot system including a sensor that is capable of detecting physique information or identification information of an actual worker.

In addition, in this embodiment, the identification information R1, R2, R3, or R4 of the actual worker R1, R2, R3, or R4 is input for each of the taught points P1, P2, P3, and P4 before the motion program is executed; however, alternatively, as shown in FIG. 16, a sensor 20 that can detect the physique information $L_{R1}$, $L_{R2}$, $L_{R3}$, or $L_{R4}$ or the identification information R1, R2, R3, or R4 of the actual worker R1, R2, R3, or R4 may be provided. Examples of the sensor 20 that detects the physique information $L_{R1}$, $L_{R2}$, $L_{R3}$, or $L_{R4}$ include a camera or the like that captures an image of the worker that performs the work on the workpiece W at a work point. In addition, examples of the sensor 20 that can detect the identification information R1, R2, R3, or R4 include a facial recognition device, a fingerprint recognition device, and so forth.

With the sensor 20, it is possible to automatically acquire the physique information $L_{R1}$, $L_{R2}$, $L_{R3}$, or $L_{R4}$ without having the actual worker R1, R2, R3, or R4 input the identification information R1, R2, R3, or R4, and it is possible to prevent an input omission.

In this case, the heights or the shoulder heights can be employed as the pieces of physique information $L_{R1}$, $L_{R2}$, $L_{R3}$, and $L_{R4}$ to be detected by the sensor 20. As a result of employing the shoulder heights, precise detections are possible even if the actual workers R1, R2, R3, and R4 are wearing helmets on their heads.

In addition, in this embodiment, the z-coordinate of the taught point P1, P2, P3, or P4 is corrected by an amount proportional to the height difference ΔL between the reference worker S and the actual worker R1, R2, R3, or R4; however, alternatively, the correction may be performed by an amount calculated by means of an arbitrary function returning a value that monotonically increases in accordance with the height difference ΔL.

In addition, this embodiment has been described in terms of an example in which a taught point to which the "correction needed" flag is set coincides with a work point of the reference worker; however, alternatively, the "correction needed" flag may be set to a taught point that is not a work point of the reference worker. For example, in the case in which the table 10 is not present in FIG. 9, there are cases in which the amount of time required for a series of motions can be reduced by appropriately also correcting the taught points P2 and P3.

For example, in the case in which taught points P2 and P3 that are not work points are corrected in a motion program including a plurality of work points, the correction may be performed by using the average value of the height differences at work points before and after the taught points P2 and P3.

Specifically, taking FIG. 9 as an example, the z-coordinates of the taught points P2 and P3 are corrected by using the equations below:

$$\Delta L1 = L_{R1} - L_{S1}$$

$$\Delta L4 = L_{R3} - L_{S2}$$

$$z' = z + \alpha(\Delta L_1 + \Delta L_4)/2.$$

Here, $\Delta L_1$ is the difference at the taught point P1, $\Delta L_4$ is the difference at the taught point P4, and a is a positive constant.

In the example shown in FIG. 9, the z-coordinates are corrected so as to be lower at both the taught points P1 and P4 that are work points; therefore, in the case in which the taught points P2 and P3 that are not work points are not corrected, the path length after the correction becomes longer than the path length before the correction. In contrast, as a result of also correcting the taught points P2 and P3 that are not work points in accordance with the corrections of the taught points P1 and P4 that are working points, the path length from the taught point P1 to the taught point P4 is reduced, and thus, it is possible to enhance the work efficiency.

The invention claimed is:

1. A robot system comprising:
a robot configured to grip and carry a workpiece; and
a controller configured to control the robot;
wherein the controller includes:
a physique-information acquisition unit that acquires physique information of an actual worker who performs work on the workpiece cooperatively with the robot;
a physique-information storage unit configured to store physique information of a reference worker;
a program storage unit configured to store a motion program including one or more taught points for disposing the workpiece at a position and orientation suitable for the work performed by the reference worker; and
a program correction unit that perform correction on the taught points of the motion program stored in the program storage unit based on the physique information of the actual worker acquired by the physique-information acquisition unit and the physique information of the reference worker stored in the physique-information storage unit,
wherein the program storage unit is configured to store information which is for each of the taught points and which is about whether the correction is needed for each of the taught points; and
wherein the program correction unit performs the correction on the taught points for which the stored information indicating that the correction is needed and does not perform the correction on the taught points for which the stored information indicating that the correction is not needed.

2. The robot system comprising:
a robot configured to grip and carry a workpiece; and
a controller configured to control the robot;
wherein the controller includes:
a physique-information acquisition unit that acquires physique information of an actual worker who performs work on the workpiece cooperatively with the robot;
a physique-information storage unit configured to store physique information of a reference worker;
a program storage unit configured to store a motion program including one or more taught points for disposing the workpiece at a position and orientation suitable for the work performed by the reference worker; and a program correction unit that perform correction on the taught points of the motion program stored in the program storage unit based on the physique information of the actual worker acquired by the physique-information acquisition unit and the physique information of the reference worker stored in the physique-information storage unit, wherein:

the program storage unit is capable of storing at least one of an upper limit value and a lower limit value for each of the taught points; and the program correction unit performs the correction on the taught points for which the upper limit value or the lower limit value is stored so as to correct vertical-direction coordinates of the taught points to be equal to or more than the lower limit value and equal to or less than the upper limit value.

3. The robot system according to claim 1, wherein:

the physique-information storage unit is configured to store identification information and the physique information of the actual worker to be associated with each other;

the program storage unit is configured to store, for each of the taught points, the identification information of the actual worker who performs the work at the taught point; and the physique-information acquisition unit acquires, for each of the taught points, the physique information of the actual worker stored in the physique-Information storage unit based on the identification information stored in the program storage unit.

4. The robot system according to claim 1, wherein the physique-information acquisition unit includes a sensor that detects the physique information or identification information of the actual worker.

5. The robot system according to claim 2, wherein:

the physique-information storage unit is configured to store identification information and the physique information of the actual worker to be associated with each other;

the program storage unit is configured to store, for each of the taught points, the identification information of the actual worker who performs the work at the taught point; and the physique-information acquisition unit acquires, for each of the taught points, the physique information of the actual worker stored in the physique-information storage unit based on the identification information stored in the program storage unit.

6. The robot system according to claim 2, wherein the physique-information acquisition unit includes a sensor that detects the physique information or the identification information of the actual worker.

* * * * *